United States Patent [19]

Coates

[11] 4,092,583

[45] May 30, 1978

[54] APPARATUS AND METHOD FOR DETERMINATION OF SUBSURFACE POROSITY UTILIZING MICROWAVE ELECTROMAGNETIC ENERGY

[75] Inventor: George R. Coates, Houston, Tex.

[73] Assignee: Schlumberger Technology Corporation, New York, N.Y.

[21] Appl. No.: 773,996

[22] Filed: Mar. 3, 1977

[51] Int. Cl.² .......................... G01V 3/12; G01V 3/18
[52] U.S. Cl. ......................................................... 324/6
[58] Field of Search ........................................ 324/6–8

[56] References Cited

U.S. PATENT DOCUMENTS

| 3,849,721 | 11/1974 | Calvert | 324/6 |
| 3,944,910 | 3/1976 | Rau | 324/6 |

Primary Examiner—Gerard R. Strecker
Attorney, Agent, or Firm—Martin M. Novack

[57] ABSTRACT

The disclosure is directed to an apparatus and method for determining the water-filled porosity of formations surrounding a borehole. Means are provided for deriving a first quantity which is a measure of the travel time of microwave electromagnetic energy propagating over a predetermined distance in the formations, this first quantity being designated as $t_{pl}$. Means are also provided for deriving a second quantity which is a measure of the attenuation of the microwave electromagnetic energy propagating over the predetermined distance in the formations, the second quantity being the attenuation constant, $\alpha$, in the preferred embodiment. Further means, responsive to the second quantity, are provided for generating a third quantity, designated $t_{pwl}$, which is representative of the travel time of microwave electromagnetic energy propagating over the predetermined distance in water having a lossiness determined from the second quantity. Finally, means responsive to the first and third quantities are provided for generating a porosity-indicative quantity, designated $\phi_w$, as a function of the first and third quantities. In the preferred embodiment of the invention, means are provided for deriving a fourth quantity, designated $t_{pm}$, representative of the travel time of microwave electromagnetic energy propagating over the predetermined distance in the formation matrix. In this embodiment, the means for generating a porosity-indicative quantity is also responsive to the fourth quantity for generating the porosity-indicative quantity as a function of the first, third, and fourth quantities.

29 Claims, 4 Drawing Figures

APPARATUS AND METHOD FOR DETERMINATION OF SUBSURFACE POROSITY UTILIZING MICROWAVE ELECTROMAGNETIC ENERGY

BACKGROUND OF THE INVENTION

This invention relates to determination of parameters of subsurface formations and, more particularly, to an apparatus and method for determining the water-filled porosity of formations surrounding a borehole.

A number of techniques presently exist for determining the porosity of subsurface formations. Typically, electrical, sonic, and/or nuclear logging devices are lowered into a borehole and information from one or more of these devices is utilized to obtain a measure of the porosity of subsurface formations. Typically, readings or samples indicative of other subsurface parameters, for example lithology and saturation of fluids, is also determined, and the determination of porosity is made using a combination of available information.

There are a number of different porosity parameters, and it is generally useful to obtain information about each one, if possible. Total porosity, designated $\phi_t$, generally means the total fraction of formation unit volume which is occupied by pore spaces or interstices. Water-filled porosity, designated $\phi_w$, is the fraction of the formation unit volume occupied by water, and hydrocarbon porosity, designated $\phi_{hc}$, is the fraction of formation unit volume occupied by hydrocarbons. Generally, $\phi_t$ equals the sum of $\phi_w$ and $\phi_{hc}$. It is evident that in situations when two of these three porosity parameters are known with reasonable reliability, valuable conclusions can be drawn concerning the nature of the subsurface formations under investigation. It is also known that comparison of porosity determinations from different logging devices, even ones which supposedly yield information concerning the same porosity parameter, can be highly useful in determining the nature of subsurface formations. Accordingly, it would be useful to have an additional reliable measure of a porosity parameter, such as $\phi_w$, which will typically be utilized in conjunction with other logging information in visualizing the overall nature of subsurface formations traversed by a borehole.

In the U.S. Pat. No. 3,944,910 of Rama Rau there is disclosed an apparatus for injecting microwave electromagnetic energy into subsurface formations to investigate properties of the formations. The Rau patent discloses, inter alia, a technique for determining the loss-corrected velocity (where velocity is inversely related to travel time) of microwave electromagnetic energy propagating through subsurface formations. For loss-less media, the velocity of propagation of electromagnetic energy is inversely proportional to the square root of the dielectric constant. A velocity correction is generally made, however, when the propagating media exhibits lossiness.

It has been proposed that water-filled porosity of a subsurface formation, consisting of water in a matrix, could be determined by obtaining the loss-corrected velocity of the formation, and then utilizing a time-average relationship to determine the water-filled porosity. In particular, the following relationship has been set forth:

$$\sqrt{\epsilon_{corr}} = (1 - \phi_w) \sqrt{\epsilon_m} + \phi_w \sqrt{\epsilon_{wo}} \qquad (1)$$

where $\epsilon_{corr}$ represents the loss-corrected dielectric constant of the formations, $\epsilon_{wo}$ is the dielectric constant of lossless water, and $\epsilon_m$ is the dielectric constant of the formation matrix. $\epsilon_{corr}$ can be obtained using the techniques set forth in the referenced Rau patent. $\epsilon_{wo}$ is determinable, for a particular frequency and temperature, experimentally in the laboratory. If lithology is known, $\epsilon_m$ of the matrix, generally assumed to be lossless, is also known. The square root of dielectric constant is inversely proportional to velocity, so the relationship (1) is in a time-average form. Relationship (1) indicates that the composite velocity is expressed as an average of the velocity in the water multiplied by the fractional volume of water plus the velocity in the matrix multiplied by the fractional volume of the matrix. All terms in the relationship (1) consider the various propagation media (matrix, fluid, and composite) as being lossless, bearing in mind that the measured dielectric constant has been loss-corrected in this expression. Solving for $\phi_w$ yields:

$$\phi_w = \frac{\sqrt{\epsilon_{corr}} - \sqrt{\epsilon_m}}{\sqrt{\epsilon_{wo}} - \sqrt{\epsilon_m}} \qquad (2)$$

It is an object of the present invention to provide an apparatus and method which yields a determination of water-filled porosity which is an improvement over prior art techniques, such as the one relating to expression (2).

SUMMARY OF THE INVENTION

Applicant has discovered that a possible disadvantage of the technique set forth in the Background section hereof is that the loss correction applied to obtain a measure of the loss-corrected velocity or transit time in the composite material may introduce undesirable inaccuracies. It is believed that a reason for the inaccuracies is that the correction does not take into account the fact that a component of the measured value (which is corrected to obtain $\epsilon_{corr}$) is attributable to the matrix portion of the formations, the matrix generally being virtually lossless material. Accordingly, the correction to obtain $\epsilon_{corr}$ tends to introduce overall loss correction to a value when at least a portion of the value does not actually require loss correction. Applicant's invented apparatus and method utilizes a different approach wherein it is not attempted to determine the loss-corrected velocity or propagation time through the composite formation.

The present invention is directed to an apparatus and method for determining the water-filled porosity of formations surrounding a borehole. The formations are assumed to comprise a matrix, which may be any subsurface solid material, and a fluid contained in the matrix, such as in pore spaces or interstices therein. As used herein, the term "water-filled porosity" is intended to mean the fraction of the total (matrix plus fluid) formation volume occupied by water. In accordance with an embodiment of the invention, means are provided for deriving a first quantity which is a measure of the travel time of microwave electromagnetic energy propagating over a predetermined distance in the formations, this first quantity being designated as $t_{pl}$. As used herein, microwave electromagnetic energy is defined as being electromagnetic energy in the range of frequencies between about 300 MHz and 300 GHz. Means are also provided for deriving a second quantity which is a measure of the attenuation of the microwave electromagnetic energy propagating over the predetermined distance in the formations, the second quantity being the attenuation constant, $\alpha$, in the present embodiment. Further means, responsive to the second quantity, are provided for generating a third quantity, designated $t_{pwl}$, which is representative of the travel time of microwave electromagnetic energy propagating over the predetermined distance in water having a lossiness determined from the second quantity. Finally, means responsive to the first and third quantities are provided for generating a porosity-indicative quantity, designated $\phi_w$, as a function of the first and third quantities.

In the preferred embodiment of the invention, means are provided for deriving a fourth quantity, designated $t_{pm}$, representative of the travel time of microwave electromagnetic energy propagating over the predetermined distance in the formation matrix. In this embodiment, the means for generating a porosity-indicative quantity is also responsive to the fourth quantity for generating the porosity-indicative quantity as a function of the first, third and fourth quantities. In particular, the porosity-indicative quantity, $\phi_w$, is generated in accordance with the relationship $$\phi_w = \frac{t_{pl} - t_{pm}}{t_{pwl} - t_{pm}}.$$

Also, in this embodiment the means for generating the third quantity, $t_{pwl}$, is additionally responsive to a fifth quantity, designated $t_{pwo}$, which represents the travel time of microwave electromagnetic energy propagating over the predetermined distance in substantially lossless water. In particular, the fourth quantity is generated in accordance with the relationship $$i\, t_{pwl} = \sqrt{t_{pwo}^2 + K\alpha^2}$$

Further features and advantages of the invention will become more readily apparent from the following detailed description when taken in conjunction with the accompanying drawings.

DESCRIPTION OF THE PREFERRED EMBODIMENT

Figure 1:
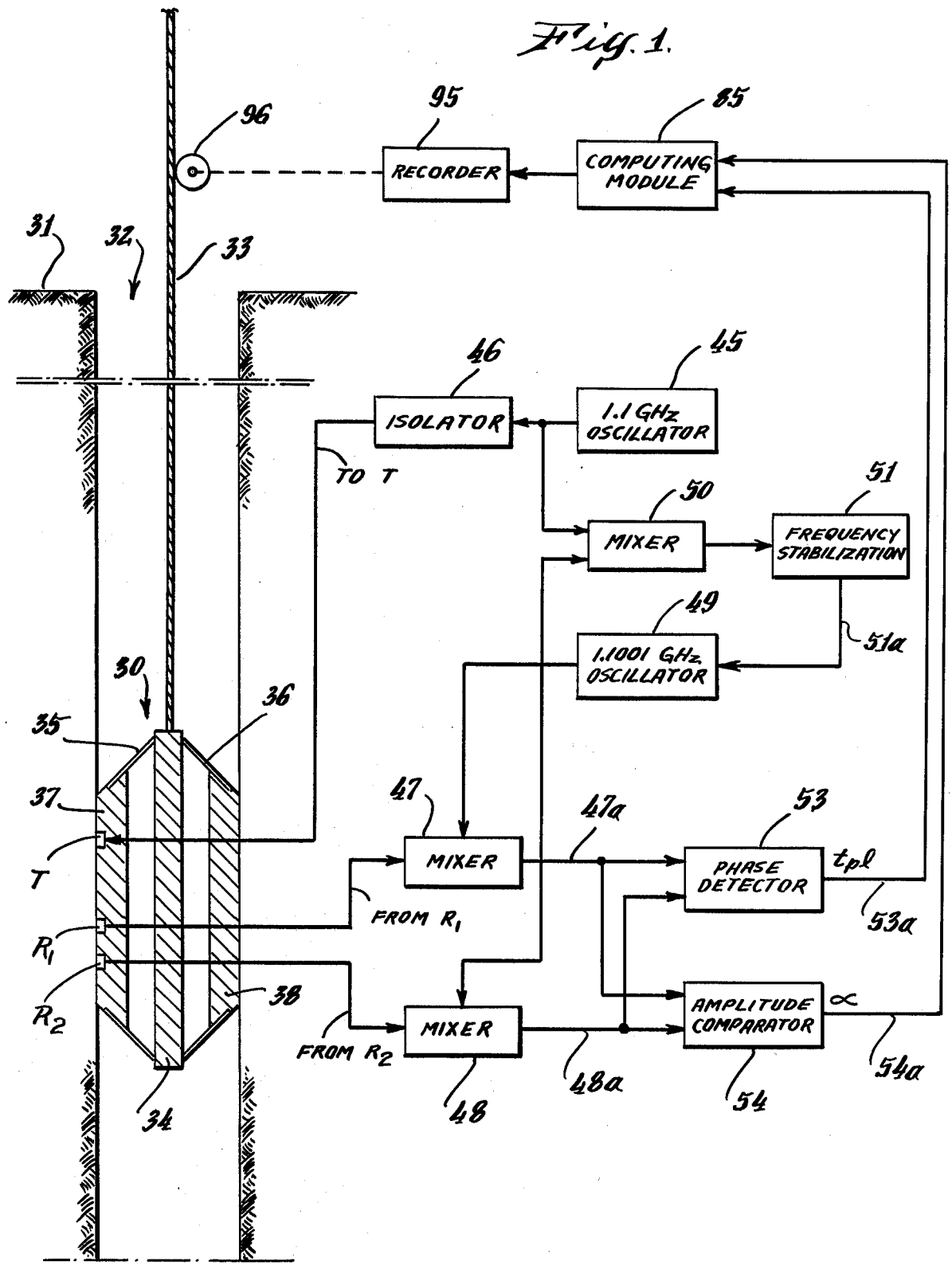
FIG. 1 is a schematic representation, partially in block form, of an apparatus incorporating an embodiment of the invention.

Before proceeding to describe the apparatus and method of the present invention in detail, it is helpful in understanding the invention to review subject matter developed in the abovereferenced U.S. Pat. No. 3,944,910 of Rau.

Consider a plane electromagnetic wave propagating in a lossless dielectric medium. The wave propagates with a velocity $$V = 1/\sqrt{\mu\epsilon} \tag{3}$$

where $\mu$ is the magnetic permeability and $\epsilon$ the dielectric constant of the medium. If the type of materials under consideration are generally non-magnetic, $\mu$ can be considered as a known constant and $\epsilon$ can be determined from the relationship $$\epsilon = 1/\mu V^2. \tag{4}$$

Next, consider two points in fixed space relation along the direction of propagation of the wave. For a given angular frequency, $\omega$, the phase difference of the wave as between the two points is $$\phi = \omega L/V = \beta L \tag{5}$$

where L is the distance separating the two points and $\beta$ is the phase constant of the wave as defined by $\beta = \omega/V$. Substituting from equation (5) it is seen that $\epsilon$ can be obtained after determination of the phase constant from the relationship $\beta = \omega\sqrt{\mu\epsilon}$ as $$\epsilon = \beta^2/\omega^2\mu \tag{6}$$

In terms of the phase measured between two points, the appropriate expression is $$\epsilon = \phi^2/(\omega^2 L^2 \mu) \tag{7}$$

The preceding relationships are valid for a lossless material, but subsurface media of interest generally have appreciable lossiness. The propagation constant, $\gamma$, of a plane electromagnetic wave propagating in a lossy medium is a complex quantity of the form $$\gamma = \omega\sqrt{\mu\epsilon}\sqrt{1 + j(\sigma/\omega\epsilon)} \tag{8}$$

where $\sigma$ is the conductivity of the medium. For the case where $\sigma$ is zero or very small, the "loss tangent" term $\sigma/\phi\epsilon$ can be neglected and we have $\gamma = \beta = \omega\sqrt{\mu\epsilon}$ which is consistent with equation (6) for the lossless case. When $\sigma$ is significant, however, the loss tangent term can be kept relatively small by having $\omega$ very large. In such case, the equation (6) is again approximately valid. For example, when $\sigma/\omega\epsilon = 0.2$, a calculation of $\epsilon$ in accordance with equation (4) yields only about a 0.5% error as compared to the case where $\sigma/\omega\epsilon$ is zero.

As discussed in the referenced patent, there are practical limits on how high a frequency can be used in making meaningful measurements in a borehole. Thus, for formations of appreciable conductivity, the use of the highest practical frequencies may still result in a significant loss tangent which, if ignored, will lead to error in measuring the apparent value of dielectric constant. In the referenced patent, measurements of dielectric constant are corrected for loss tangent, for example to obtain the quantity $\epsilon_{corr}$ referred to in the Background hereof.

To better understand the techniques utilized herein, it is helpful to initially represent the real and imaginary parts of the propagation constant, $\gamma$, as $\beta$ and $\alpha$, respectively, so we have $$\gamma = \beta + j\alpha \tag{9}$$

where $\alpha$ is associated with wave attenuation or loss. (Note that the propagation constant is used in the well known wave equation in the form $e^{j\gamma}$, so the real part of the propagation constant becomes the imaginary part of the exponent and vice versa.) Squaring equations (8) and (9) and equating the real parts of each gives $$\beta^2 - \alpha^2 = \mu\epsilon\omega^2 \qquad (10)$$

or $$\beta = \sqrt{\mu\epsilon\omega^2 + \alpha^2} \qquad (11)$$

The equation (11) will be referred to hereinbelow.

Applicant has discovered that an improved determination of the water-filled porosity of formations surrounding a borehole can be obtained by utilizing a time average relationship wherein the measured travel time of microwave electromagnetic energy through the composite formation is not itself corrected. Instead, the term or signal representing the travel time of the energy in the water (only) is corrected. This is done by using a measured value of attenuation to obtain a quantity which represents the travel time of the energy in water having an appropriate degree of lossiness. In particular, the following relationship is set forth:

$$t_{pl} = \phi_w t_{pwl} + (1 - \phi_w)t_m \qquad (12)$$

where $\phi_w$ is the water-filled porosity of the formations, $t_{pl}$ is the measured transit time of the microwave electromagnetic energy (uncorrected), $t_{pm}$ is the propagation time through the matrix (generally considered lossless), and $t_{pwl}$ is the propagation time through water having the lossiness of the formation water. In all cases, the propagation times are for a particular travel distance in the formation, determined from the spacing between a pair of receivers. Solving (12) for $\phi_w$ yields $$\phi_w = \frac{t_{pl} - t_{pm}}{t_{pwl} - t_{pm}} \qquad (13)$$

In the present embodiment, the quantity $t_{pwl}$ is determined from the relationship $$t_{pwl} = \sqrt{t_{pwo}^2 + K\alpha^2} \qquad (14)$$

where $t_{pwo}$ is the transit time of the microwave electromagnetic energy through lossless water, which is determinable, for a particular frequency and temperature, in a laboratory, $\alpha$ is the measured attenuation constant, and K is a constant. The relationship (14) is seen to be of the form of the equation (11) and indicates that the propagation time through a lossy fluid is greater than the propagation time through an equivalent lossless fluid by an amount which depends upon $\alpha$. A relatively accurate determination of $\phi_w$ is thus obtained by loss-correcting only the quantity which has lossiness fully attributable to it. It should be noted that the equation (12) considers $\phi_w = \phi_t$ in setting forth a time average relationship; i.e., any hydrocarbon content is considered as part of the matrix from the standpoint of propagation time determination.

It should be noted that the relationship (14) set forth above, which applicant has found to be effective in practice, deviates from expected theory in one respect, which can be described as follows: Assume that the measured attenuation of the bulk formation is designated as $\alpha_c$ and can be expressed as $$\alpha_c = \phi_w \alpha_w + (1-\phi_w)\alpha_m \qquad (15)$$

where $\alpha_w$ is the attenuation attributable to the formation water and $\alpha_m$ is the attenuation attributable to the formation matrix. Since $\alpha_m$ is close to zero, equation (15) reduces to $$\alpha_c = \phi_w \alpha_w \qquad (16)$$

or $$\alpha_w = \alpha_c/\phi_w \qquad (17)$$

which merely express that the bulk formation losses are volumetrically "adjusted" (by a factor of $\phi_w$) to take account of the fact that loss is essentially only occurring in that fraction of the bulk formation occupied by the water. Using the general form of equation (11) one might expect a suitable expression for $t_{pwl}$ to be $$t_{pwl} = \sqrt{t_{pwo}^2 + K\alpha_w^2} \qquad (18)$$

where each of the terms is related to the water volume; i.e., $t_{pwl}$ and $t_{pwo}$, as well as $\alpha_w$, are for some given consistent volume of water through which the energy has propagated. Since the measured $\alpha_c$ is associated with energy which has propagated through the bulk formation (matrix as well as fluid), it would stand to reason that equation (17) could be utilized to obtain a volumetrically consistent $\alpha_w$. Substituting into equation (18) yields the expected relationship:

$$t_{pwl} = \sqrt{t_{pwo}^2 + K\alpha_c^2/\phi_w^2} \qquad (19)$$

As stated, however, the relationship (14), which excludes the division of the second term under the radical by the factor $\phi_w^2$, has been found to yield effective and accurate results.

Referring to FIG. 1, there is shown a representative embodiment of an apparatus in accordance with the present invention for investigating subsurface formations 31 traversed by a borehole 32. The borehole 32 is typically filled with a drilling fluid or mud which contains finely divided solids in suspension. The investigating apparatus or logging device 30 is suspended in the borehole 32 on an armored cable 33, the length of which substantially determines the relative depth of the device 30. The cable length is controlled by suitable means at the surface, such as a drum and winch mechanism (not shown).

The logging device 30 includes an elongated cylindrical support member 34, the interior portion of which has a fluid-tight housing containing the bulk of the downhole electronics. Mounted on support member 34 are a pair of bowed springs 35 and 36. The spring 35 has mounted thereon a pad member 37 which contains, inter alia, a transmitting antenna T and vertically spaced receiving antennas $R_1$ and $R_2$. Mounted on the spring 36 is a secondary pad member 38 which may be an inactive pad that facilitates smooth vertical movement of the device 30 through the borehole. If desired, however, the pad 38 may contain electrodes or like additional means for investigating the surrounding formations. Electronic signals indicative of the information obtained by the logging device are transmitted through the cable 32 to a computing module 85 and recorder 95 located at the surface of the earth. The particular means shown in FIG. 1 for maintaining the antennas in engagement with the borehole wall is illustrative, and it will be appreciated that other suitable means for accomplishing this objective, such as hydraulic means, can be utilized.

Figure 2:
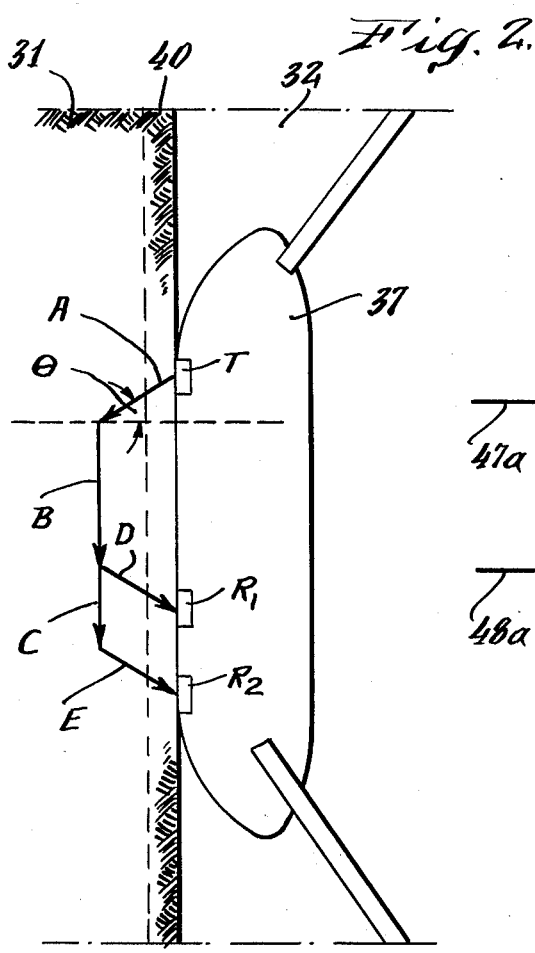
FIG. 2 illustrates, in simplified form, the nature of propagation of a microwave electromagnetic surface wave in the formations.

FIG. 2 illustrates, in simplified form, the nature of propagation of the electromagnetic wave to be measured with the apparatus of FIG. 1. (For a more detailed description of the wave propagation path, reference can be made to the Rau U.S. Pat. No. 3,944,910.) In FIG. 2 the pad 37 is shown positioned against the side of the borehole 32 which, as above-stated, is filled with a drilling mud. Generally, the fluid pressure in the formations traversed by a borehole is less than the hydrostatic pressure of the column of mud in the borehole, so that the mud and mud filtrate flows somewhat into the formations. The formations tend to screen the small particles suspended in the mud so that a mudcake is formed on the walls of the borehole. The thickness of the mudcake varies with formation parameters such as permeability, but at least a very thin mudcake is usually present on the borehole wall. In FIG. 2, the pad 37 contacts a mudcake 40 which is shown as being of exaggerated scale thickness for illustrative clarity.

The transmitting antenna T emits microwave electromagnetic energy into the formation as represented by the arrow A. A resultant lateral wave propagating in the formation is represented by the arrow B and its extension, arrow C. The lateral wave continuously sheds energy back into the more lossy media (the mudcake), and the portions of energy which are shed at the approximate locations of the receivers $R_1$ and $R_2$ are represented by the arrows D and E, respectively. If the pathlengths represented by arrows D and E are assumed to be substantially equal, it is seen that the difference in pathlength between the energy received at $R_1$ (via path A-B-D) and the energy received at $R_2$ (via path A-B-C-E) is the distance represented by arrow C; i.e., the distance between the receivers. Accordingly, a differential receiver arrangement allows investigation of the portion of the formation lying approximately opposite the separation between $R_1$ and $R_2$. Typically, but not necessarily, the investigated formation will be the "flushed" or "invaded" zone which surrounds the mudcake in the borehole and contains fluids from the mud which filter through the mudcake.

Referring again to FIG. 1, the downhole electronics contained within the member 34 are shown, for convenience of illustration, at the side of the borehole. A solid state oscillator 45 provides output energy in the microwave region of the spectrum. The microwave region is defined herein as including the range of frequencies between about 300 MHz and 300 GHz. The oscillator 45 may operate at the suitable frequency of 1.1 GHz; i.e., $1.1 \times 10^9$ cycles per second. The output of oscillator 45 is coupled through an isolator 46 to the transmitting antenna T. Microwave energy is transmitted into the surrounding formations and propagates through the formations in the manner previously described. The energy which arrives at the receiving antennas $R_1$ and $R_2$ is respectively coupled to input terminals of the mixers 47 and 48. The signals which arrive from $R_1$ and $R_2$ are out of phase with each other by an amount which depends on the phase constant $\beta$ and have an amplitude ratio which depends upon the attenuation constant $\alpha$. Secondary input terminals of the mixers are supplied with microwave energy at a frequency that is separated from the transmitter frequency by some relatively low frequency which is typically in the radio frequency range. In the embodiment shown, a solid state oscillator 49 supplies microwave energy to mixers 47 and 48 at a frequency of 1.1001 GHz, or 100 KHz above the transmitter frequency. The output signals 47A and 48A of the mixers 47 and 48 therefore contain the difference frequency of 100 KC. In accordance with well known principles, the signals 47A and 48A maintain the phase and amplitude relationships of the signals from $R_1$ and $R_2$, but the task of phase detection is greatly facilitated at the lower frequency of the mixed signals. To insure that the difference frequency between the outputs of the oscillators 45 and 49 remains at 100 KHz, the oscillator outputs are sampled and fed to a mixer 50. The output of the mixer is received by a frequency stabilization circuit 51 which detects drifts from the 100 KC standard and generates a correction signal 51A which controls oscillator 49 in the manner of a conventional "phase-locked loop."

Figure 3:
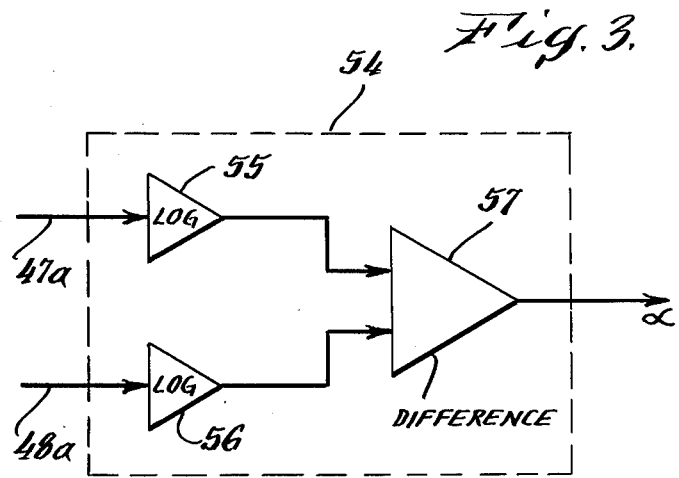
FIG. 3 is a block diagram of the amplitude comparator of FIG. 1.

The signals 47A and 48 are applied to a phase detector circuit 53 and to an amplitude comparator 54. The output of the phase detector 53 is a signal level which is proportional to the phase difference $\phi$ between the signals received at $R_1$ and $R_2$, and thus proportional to $\beta$ in accordance with $\beta = \phi/L$, where L is the distance separating the two receivers. For a particular frequency of operation, $\omega$, the phase difference $\phi$ is also proportional to the travel time through the formations over the distance L in accordance with $t_{pl} = \phi/L\omega$, where $t_{pl}$ is the travel time. The output of amplitude comparator 54 is a signal level which is proportional to the attenuation constant $\alpha$. A convenient circuit 54 for obtaining an output signal proportional to $\alpha$ is shown in FIG. 3. The signals 47A and 48A are respectively applied to the logarithmic amplifiers 55 and 56 whose outputs are fed to the difference amplifier 57. The output of the difference amplifier 57 is a signal level proportional to $\alpha$. This can be visualized by representing the amplitude of the wave energy received at R as $Ae^{-\alpha z}$, where A is an amplitude constant and z is the distance separating T and $R_1$. It follows that the amplitude of the wave energy received at $R_2$ is $Ae^{-\alpha(z+L)}$, where L is the distance separating the receivers $R_1$ and $R_2$. The ratio of the wave amplitudes at the two receivers is therefore $$Ae^{-\alpha(z+L)}/Ae^{-\alpha z} = e^{-\alpha L}.$$

The log of the ratio of the wave amplitudes is therefore proportional to $\alpha$. It will be appreciated that the circuit 54 of FIG. 3 accomplishes the same mathematical result by taking the difference of the logs of the wave amplitudes.

The output representative of $t_{pl}$ and $\alpha$ are transmitted to the surface over the conductor pair 53a and 54a which in actuality pass through the armored cable 33. Typically, these signals may be DC levels which are stepped-up by amplification before transmission to the surface. At the surface of the earth the signals on the lines 53a and 54a are applied to a computing module 85 which computes the water-filled porosity, $\phi_w$, of the formations in accordance with the relationships (13) and (14). The computed porosity is recorded by a recorder 95 that is conventionally driven as a function of borehole depth by mechanical coupling to a rotating wheel 96. The wheel 96 is coupled to the cable 33 and rotates in synchronism therewith so as to move as a function of borehole depth. Thus, the water-filled porosity is recorded as a function of borehole depth by the recorder 95.

Figure 4:
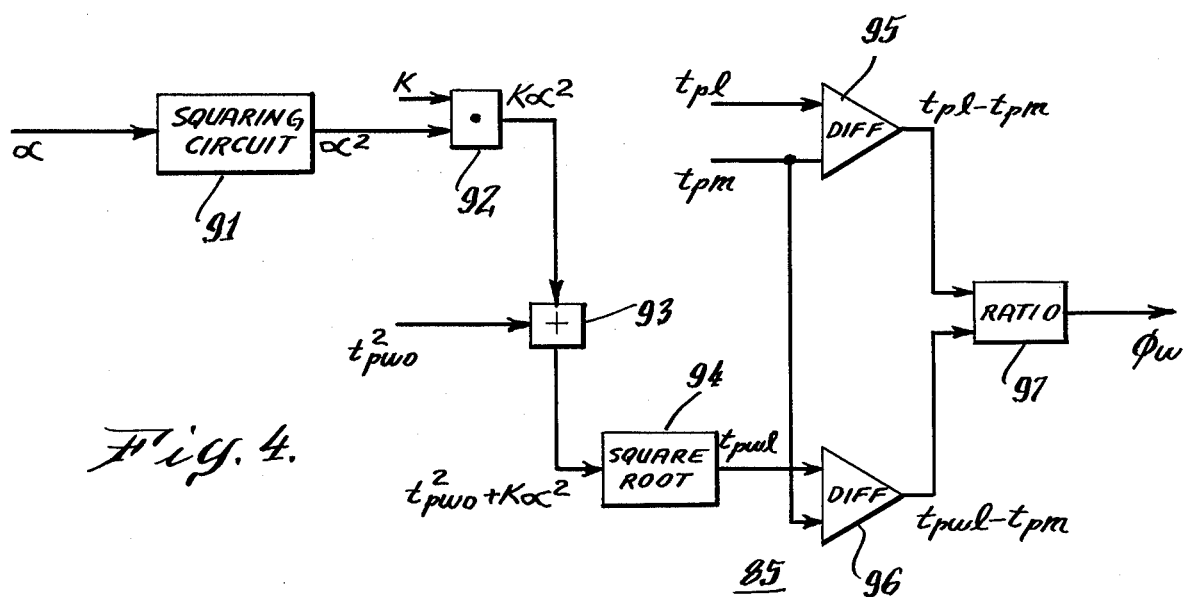
FIG. 4 is a block diagram of the computing module of FIG. 1.

FIG. 4 is a block diagram of the computing module 85 which receives the signals on lines 53a and 54a that are indicative of the measured values of $t_{pl}$ and $\alpha$, respectively. The signal representative of $\alpha$ is coupled to a squaring circuit 91 and the signal representative of $t_{pl}$ is coupled to the positive input terminal of a difference amplifier 95. The output of squaring circuit 91, which is representative of $\alpha^2$, is coupled to one input of a multiplier circuit 92, the other input to which is an adjustable signal representative of a constant, K. The output of circuit 92, which is a signal having a value representative of $K\alpha^2$ is one input to a summing circuit 93. The other input to summing circuit 93 is a signal level representative of the value of $t_{pwo}^2$. As previously stated, $t_{pwo}$ is the travel time of microwave electromagnetic energy, at the frequency $\omega$, in substantially lossless water over the distance L. This value is determinable in a laboratory as, for example, 28.3 nanoseconds per meter at 1.1 GHz at 100° F. The output of summing circuit 93 is a signal representative of $t_{pwo}^2 + K\alpha^2$, and this signal is coupled to a square root circuit 94, the output of which is a signal representative of $t_{pwb}$, in accordance with the relationship (14). The output of square root circuit 94 is coupled to the positive input terminal of a difference amplifier 96. The negative input terminal of each of the difference amplifiers 95 and 96 receives a signal representative of $t_{pm}$; i.e., representative of the transit time of the microwave electromagnetic energy of frequency $\omega$, over the distance L, for the particular matrix. It is assumed that lithology is known from other logging or coring information. An example of a typical value for $t_{pm}$ for the frequency of interest is 8 nanoseconds per meter. The outputs of difference amplifiers 95 and 96 are coupled to a ratio circuit 97 which produces an output representative of $\phi_w$ in accordance with the relationship (13).

The invention has been described with reference to a particular embodiment, but variations within the spirit and scope of the invention will occur to those skilled in the art. For example, while circuitry has been described for generating analog signals representative of the desired quantities, it will be understood that a general purpose digital computer could readily be programmed to implement the techniques as set forth herein. Also, it should be noted that the advantageous principles of known borehole compensation techniques and/or of redundant processing channels, such as are disclosed in U.S. Pat. No. 3,849,721, can be utilized, if desired, in conjunction with the present invention. Further, it will be understood that the measured values can, if desired, be corrected for mudcake effect, spreading, or temperature variations, as is known in the art. Finally, although the illustrative embodiment shows various quantities as being derived directly from a logging device, these quantities may alternatively be derived from storage media or communicated from a logging location.

I claim:

1. Apparatus for determining the water-filled porosity of formations surrounding a borehole, said formations including fluid in a matrix, comprising:

means for deriving a first quantity which is a measure of the travel time of microwave electromagnetic energy propagating over a predetermined distance in the formations;

means for deriving a second quantity which is a measure of the attenuation of said microwave electromagnetic energy propagating over said predetermined distance in the formations;

means responsive to said second quantity for generating a third quantity which is representative of the travel time of microwave electromagnetic energy propagating over said predetermined distance in water having a lossiness determined from said second quantity; and means responsive to said first and third quantities for generating a porosity-indicative quantity as the function of said first and third quantities.

2. Apparatus as defined by claim 1 further comprising means for deriving a fourth quantity representative of the travel time of microwave energy propagating over said predetermined distance in said matrix, and wherein said means for generating a porosity-indicative quantity is also responsive to said fourth quantity for generating said porosity-indicative quantity as a function of said first, third and fourth quantities.

3. Apparatus as defined by claim 2 wherein said means for generating a porosity-indicative quantity generates said porosity-indicative quantity as a ratio of the difference between said first and fourth quantities and the difference between said third and fourth quantities.

4. Apparatus as defined by claim 1 wherein said means for generating said third quantity is also responsive to a fifth quantity, said fifth quantity being representative of the travel time of microwave electromagnetic energy propagating over said predetermined distance in substantially lossless water.

5. Apparatus as defined by claim 4 wherein said means for generating said third quantity is operative to generate said third quantity as a function of the square root of a quantity which is the square of said fifth quantity plus the square of said second quantity.

6. Apparatus as defined by claim 2 wherein said means for generating said third quantity is also responsive to a fifth quantity, said fifth quantity being representative of the travel time of microwave electromagnetic energy propagating over said predetermined distance in substantially lossless water.

7. Apparatus as defined by claim 6 wherein said means for generating said third quantity is operative to generate said third quantity as a function of the square root of a quantity which is the square of said fifth quantity plus the square of said second quantity.

8. Apparatus as defined by claim 3 wherein said means for generating said third quantity is also responsive to a fifth quantity, said fifth quantity being representative of the travel time of microwave electromagnetic energy propagating over said predetermined distance in substantially lossless water.

9. Apparatus as defined by claim 8 wherein said means for generating said third quantity is operative to generate said third quantity as a function of the square root of a quantity which is the square of said fifth quantity plus the square of said second quantity.

10. Apparatus for determining the water-filled porosity of formations surrounding a borehole, said formations including fluid in a matrix, comprising:

means for injecting microwave electromagnetic energy into said formations;

means for generating a first signal which is a measure of the travel time of microwave electromagnetic energy propagating over a predetermined distance in the formations;

means for generating a second signal which is a measure of the attenuation of said microwave electromagnetic energy propagating over said predetermined distance in the formations;

means responsive to said second signal for generating a third signal which is representative of the travel time of microwave electromagnetic energy propagating over said predetermined distance in water having a lossiness determined from said second signal; and means responsive to said first and third signals for generating a porosity-indicative signal as the function of said first and third signals.

11. Apparatus as defined by claim 10 further comprising means for deriving a fourth signal representative of the travel time of microwave energy propagating over a said predetermined distance in said matrix, and wherein said means for generating a porosity-indicative signal is also responsive to said fourth signal for generating said porosity-indicative signal as a function of said first, third and fourth signals.

12. Apparatus as defined by claim 11 wherein said means for generating a porosity-indicative signal generates said porosity-indicative signal as a ratio of the difference between said first and fourth signals and the difference between said third and fourth signals.

13. Apparatus as defined by claim 10 wherein said means for generating said third signal is also responsive to a fifth signal, said fifth signal being representative of the travel time of microwave electromagnetic energy propagating over said predetermined distance in substantially lossless water.

14. Apparatus as defined by claim 13 wherein said means for generating said third signal is operative to generate said third signal as a function of the square root of a quantity which is the square of said fifth signal plus the square of said second signal.

15. Apparatus as defined by claim 11 wherein said means for generating said third signal is also responsive to a fifth signal, said fifth signal being representative of the travel time of microwave electromagnetic energy propagating over said predetermined distance in substantially lossless water.

16. Apparatus as defined by claim 15 wherein said means for generating said third signal is operative to generate said third signal as a function of the square root of a quantity which is the square of said fifth signal plus the square of said second signal.

17. Apparatus as defined by claim 12 wherein said means for generating said third signal is also responsive to a fifth signal, said fifth signal being representative of the travel time of microwave electromagnetic energy propagating over said predetermined distance in substantially lossless water.

18. Apparatus as defined by claim 17 wherein said means for generating said third signal is operative to generate said third signal as a function of the square root of a quantity which is the square of said fifth signal plus the square of said second signal.

19. A method for determining the water-filled porosity of formations surrounding a borehole, said formations including fluid in a matrix, comprising the steps of:
deriving a first quantity which is a measure of the travel time of microwave electromagnetic energy propagating over a predetermined distance in the formations;
deriving a second quantity which is a measure of the attenuation of said microwave electromagnetic energy propagating over said predetermined distance in the formations;
generating a third quantity which is representative of the travel time of microwave electromagnetic energy propagating over said predetermined distance in water having a lossiness determined from said second quantity; and
generating a porosity-indicative quantity as the function of said first and third quantities.

20. The method as defined in claim 19 further comprising the step of deriving a fourth quantity representative of the travel time of microwave energy propagating over said predetermined distance in said matrix, and wherein said step of generating a porosity-indicative quantity comprises generating said porosity-indicative quantity as a function of said first, third and fourth quantities.

21. The method as defined by claim 20 wherein the step of generating a porosity-indicative quantity comprises generating said porosity-indicative quantity as a ratio of the difference between said first and fourth quantities and the difference between said third and fourth quantities.

22. The method as defined by claim 19 wherein said third quantity is also a function of a fifth quantity, said fifth quantity being representative of the travel time of microwave electromagnetic energy propagating over said predetermined distance in substantially lossless water.

23. The method as defined by claim 22 wherein said third quantity is generated as a function of the square root of a quantity which is the square of said fifth quantity plus the square of said second quantity.

24. The method as defined by claim 20 wherein said third quantity is also a function of a fifth quantity, said fifth quantity being representative of the travel time of microwave electromagnetic energy propagating over said predetermined distance in substantially lossless water.

25. The method as defined by claim 24 wherein said third quantity is generated as a function of the square root of a quantity which is the square of said fifth quantity plus the square of said second quantity.

26. The method as defined by claim 21 wherein said third quantity is also a function of a fifth quantity, said fifth quantity being representative of the travel time of microwave electromagnetic energy propagating over said predetermined distance in substantially lossless water.

27. The method as defined by claim 26 wherein said third quantity is generated as a function of the square root of a quantity which is the square of said fifth quantity plus the square of said second quantity.

28. Apparatus for determining the travel time of microwave electromagnetic energy propagating over a predetermined distance in water having a lossiness derived from measurements taken in formations surrounding a borehole, comprising:
means for deriving a quantity representative of the travel time of said microwave electromagnetic energy propagating over said predetermined distance in substantially lossless water;
means for deriving a quantity which is a measure of the attenuation of said microwave electromagnetic energy propagating over said predetermined distance in the formations; and
means responsive to said lossless travel-time-representative quantity and said attenuation-representative quantity for generating a quantity representative of the travel time of microwave electromagnetic energy propagating over said predetermined distance in water having a lossiness derived from said attenuation-representative quantity.

29. Apparatus as defined by claim 28 wherein said means for generating a quantity representative of the travel time of microwave electromagnetic energy propagating over said predetermined distance in water having a lossiness derived from said attenuation-representative quantity, and designated $t_{pwl}$ is operative to generate said quantity in accordance with the relationship $$t_{pwl} = \sqrt{t_{pwo}^2 + K\alpha^2}$$

where $t_{pwo}$ is the travel time of microwave electromagnetic energy propagating over said predetermined distance in substantially lossless water, $\alpha$ is a measure of the attenuation of the microwave electromagnetic energy propagating over the predetermined distance in the formations, and K is a constant.

* * * * *

UNITED STATES PATENT AND TRADEMARK OFFICE
CERTIFICATE OF CORRECTION

PATENT NO. : 4,092,583
DATED : May 30, 1978
INVENTOR(S) : George R. Coates

It is certified that error appears in the above-identified patent and that said Letters Patent are hereby corrected as shown below:

col. 1, last line should be $--\sqrt{\epsilon} = (1 - \phi_w)\sqrt{\epsilon_m} + \phi_w \sqrt{\epsilon_{wo}}--$ col. 3, line 35 should be $--t_{pw\ell} = \sqrt{t_{pwo}^2 + K\alpha^2}--$ col. 3, line 65 should be $--V = 1/\sqrt{\mu\epsilon}--$ col. 4, line 18 change "$\omega\sqrt{\mu\epsilon}$" to $--\omega\sqrt{\mu\epsilon}--$ col. 4, line 33 should be $--\gamma = \omega\sqrt{\mu\epsilon}\sqrt{1 + j(\sigma/\omega\epsilon)}--$ col. 4, line 37 change "$\sqrt{\mu\epsilon}$" to $--\sqrt{\mu\epsilon}--$ col. 5, line 5 should be $--\beta = \sqrt{\mu\epsilon\omega^2 + \alpha^2}--$ col. 5, line 20 in relationship (12) change "$t_m$" to $--t_{pm}--$ col. 5, line 37 should be $--t_{pw\ell} = \sqrt{t_{pwo}^2 + K\alpha^2}--$

UNITED STATES PATENT AND TRADEMARK OFFICE
CERTIFICATE OF CORRECTION

PATENT NO. : 4,092,583

DATED : May 30, 1978

INVENTOR(S) : George R. Coates

It is certified that error appears in the above-identified patent and that said Letters Patent are hereby corrected as shown below:

col. 6, line 13 should be $-- t_{pw\ell} = \sqrt{t_{pwo} + K\alpha_w^2} --$ col. 6, line 25 should be $-- t_{pw\ell} = \sqrt{t_{pwo}^2 + K\alpha_c^2/\phi_w^2} --$ col. 9, line 67 "the" should be --a-- col. 11, line 2 "the" should be --a-- col. 11, line 67 "the" should be --a-- col. 13, line 5 should be $-- t_{pw\ell} = \sqrt{t_{pwo}^2 + K\alpha^2} --$

Signed and Sealed this

Twentieth Day of March 1979

[SEAL]

Attest:

RUTH C. MASON
*Attesting Officer*

DONALD W. BANNER
*Commissioner of Patents and Trademarks*